United States Patent

[11] 3,616,034

| [72] | Inventor | Allen R. Obergfell<br>Park Ridge, Ill. |
|---|---|---|
| [21] | Appl. No. | 776,712 |
| [22] | Filed | Nov. 18, 1968 |
| [45] | Patented | Oct. 26, 1971 |
| [73] | Assignee | Fastener Corporation<br>Franklin Park, Ill. |

[54] METHOD OF FASTENING ARTICLES USING A LIQUID ADHESIVE COLUMN
16 Claims, 7 Drawing Figs.

[52] U.S. Cl. .................................................. 156/295,
117/104, 156/513, 156/547
[51] Int. Cl. .................................................. B32b 31/00
[50] Field of Search .......................................... 156/295,
500, 547; 118/410, 411; 161/53; 264/263;
117/104

[56] References Cited
UNITED STATES PATENTS

| 3,318,725 | 5/1967 | Bryan | 118/411 X |
| 3,350,249 | 10/1967 | Gregoire | 156/295 X |
| 3,420,208 | 1/1969 | Guthrie | 118/411 X |
| 3,102,829 | 9/1963 | Rathbun | 118/410 |
| 3,440,131 | 4/1969 | Tu | 161/53 |

FOREIGN PATENTS

| 221,797 | 11/1961 | Austria | 156/295 |

Primary Examiner—Samuel W. Engle
Attorney—Mason, Kolehmainen, Rathburn & Wyss

ABSTRACT: An improved fastening device is provided for driving adhesive through a solid workpiece to the interface thereof with a base member. The fastening device includes a chamber for adhesive, with a nozzle communicating from the chamber. Means are provided for propelling adhesive from the nozzle at high speed to drive the adhesive through a workpiece. The adhesive will spread between the interfaces of the workpiece and base member.

An improved method of fastening a solid workpiece to a base member is also provided. The improved method comprises driving a liquid adhesive through the workpiece with sufficient force and velocity to penetrate to the workpiece, and provide spreading of the adhesive at the interface of the workpiece and base member.

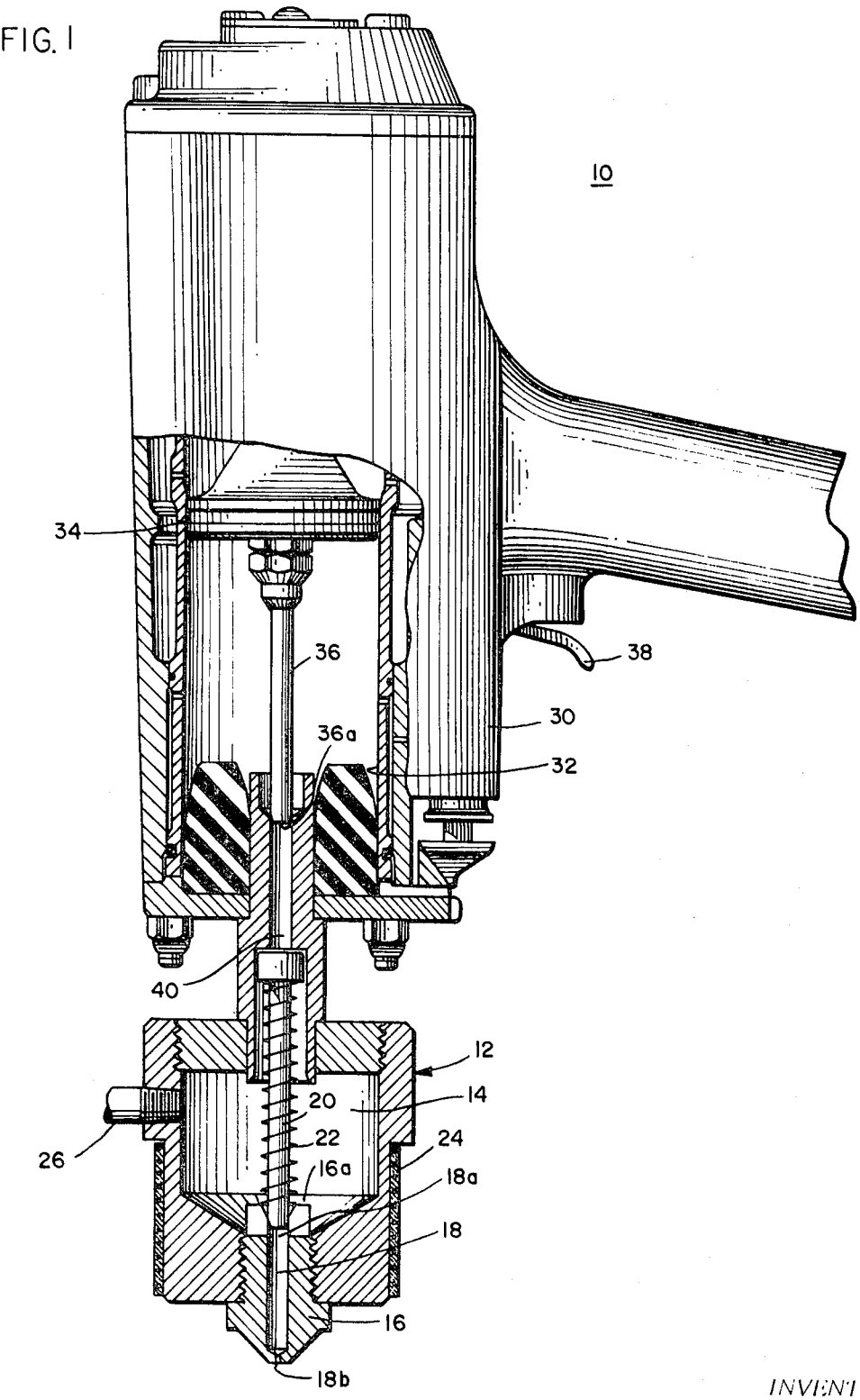

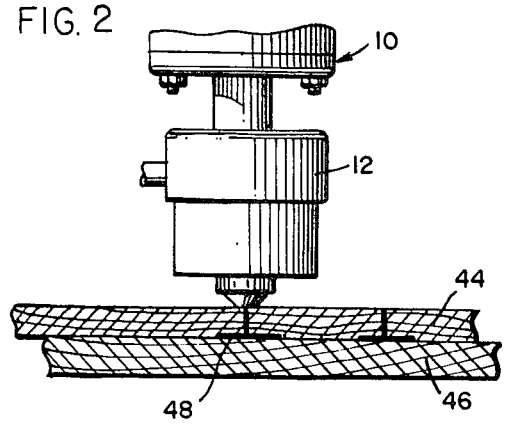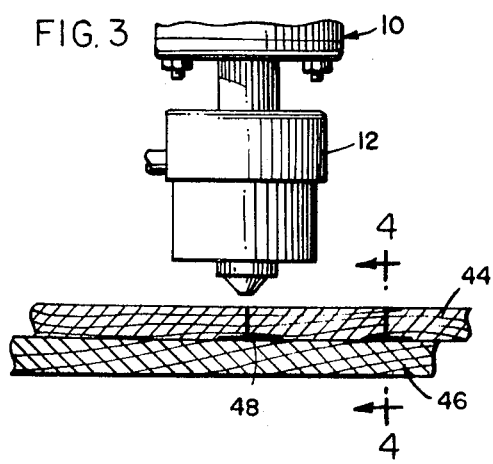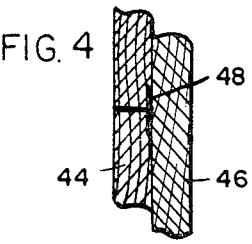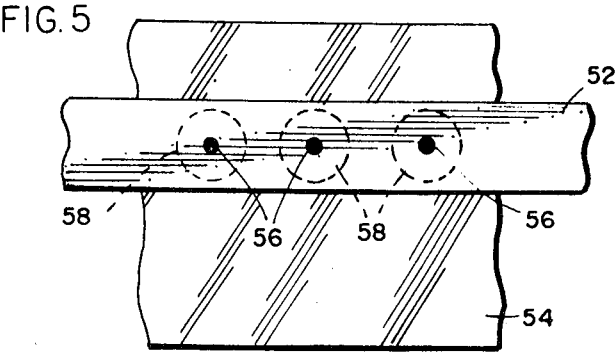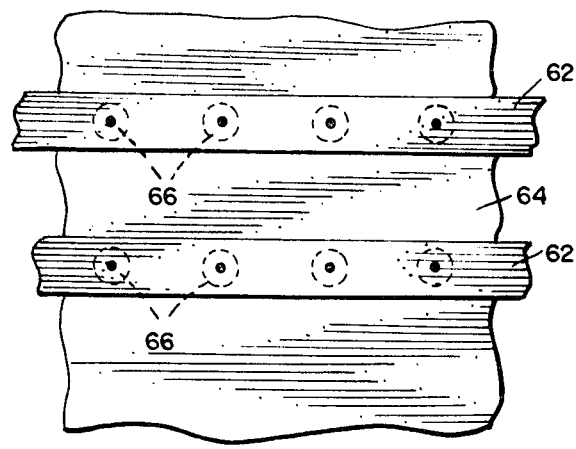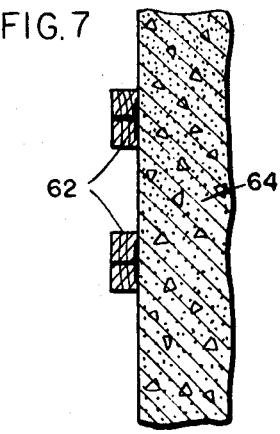
INVENTOR:
ALLEN R. OBERGFELL
ATT'YS

METHOD OF FASTENING ARTICLES USING A LIQUID ADHESIVE COLUMN

The present invention relates to a new and improved method for the adhesive fastening of two members. More specifically the present invention is directed to a method of driving an adhesive material through a solid workpiece to be spread at the interface thereof.

An object of the present invention is to provide a new and improved method of fastening members.

Yet another object of the present invention is to provide a new and improved method of adhesively securing members together.

Still another object of the present invention is the provision of a new and improved method for driving an adhesive through a solid workpiece.

Further objects and advantages of the present invention will become apparent as the following description proceeds and the features of novelty which characterize the invention will be pointed out with particularity in the claims annexed to and forming a part of the specification.

In accordance with these and other objects, there is provided an improved fastening device for driving adhesive through a solid workpiece, including an adhesive chamber communicating with a cylinder terminating in a nozzle. A plunger is provided in the cylinder for ejecting adhesive with great force and velocity. It has been found that the adhesive can be ejected with sufficient force to penetrate through a solid workpiece. The adhesive will spread at the interface of the members to provide the adhesive fastening of the members.

Many suitable drive devices may be provided for operating the plunger; however it has been found that a pneumatically operated piston and drive member engageable with the plunger function advantageously to provide the desired force and velocity for the adhesive.

The present invention is also directed to a new and improved method of fastening members together. Briefly the method consists of driving an adhesive through a solid workpiece by its own inertia, being ejected with sufficient force and velocity to penetrate the solid workpiece. The adhesive is then spread at the interface of the members to provide an adhesive bond.

Advantageously it has been found that the adhesive will penetrate through a workpiece, to the interface between a workpiece and a base member, and will spread at the interface whether or not the materials of the workpiece and base member are similar or dissimilar. Thus the method and apparatus according to the present invention may be useful for many purposes such as securing furring strips to concrete or block bases; securing dry wallboard or paneling directly to concrete or block surfaces without the use of furring strips; securing paneling or other veneer to base structures, and many other uses.

For a better understanding of the present invention, reference may be had to the accompanying drawings wherein:

FIG. 1 is a fragmentary view of a fastening device according to the present invention;

FIG. 2 is a fragmentary view illustrating a method of use of the fastening device of FIG. 1;

FIG. 3 is a fragmentary view, similar to FIG. 2, illustrating another mode of use of the fastening device of FIG. 1;

FIG. 4 is a cross-sectional view of a typical adhesive joint, taken along line 4—4 of FIG. 3;

FIG. 5 is a fragmentary view illustrating the adhesive fastening of a workpiece to a glass base member;

FIG. 6 is a fragmentary view illustrating the securing of furring strips to a concrete wall; and FIG. 7 is a cross-sectional view of the furring strips and wall structure of FIG. 6.

Referring now to the drawings, and particularly to the embodiment of FIG. 1 thereof, there is illustrated a fastening device 10 for ejecting adhesive with sufficient force and velocity to cause the adhesive to penetrate through a solid workpiece. More specifically the fastening device 10 includes a nose portion 12 having a chamber 14 for adhesive material. A nozzle 16 communicates with the chamber 14, an includes a cylinder 18 having one end 18a opening into the chamber 14, and having a restricted exit 18b of substantially reduced cross section at its other end. The nozzle structure 16 is shown as being threadedly or removably mounted on the nose portion 12 to permit nozzle 16 having different openings or exits 18b to be used. A plunger 20 is provided for reciprocal movement within the cylinder 18, and a spring 22 is provided for returning the plunger to its normal or at rest position as illustrated in FIG. 1. Projections 16a extending upwardly form the body of the nozzle 16 guide the plunger 20 into the cylinder 18, and further serve to provide passageways for the adhesive to fill the cylinder 18 after the plunger 20 has been returned to its normal position.

Although different types of adhesives with different compositions and characteristics can be used to carry out the present invention, an additional advantage is obtained using adhesives which have a rapid set or quickly attain "green strength" to permit the joined parts to be self-supporting. As an example, epoxy adhesives and hot melt adhesives are satisfactory and are well known. Hot melt adhesives, for instance, become viscous when heated to a temperature which may, with different compositions, be in the range of 250° F. to 400° F. To this end, the chamber 14 is surrounded by a suitable electrical heating jacket 24 which may, if desired, be thermostatically controlled to provide the required temperature. The material forming the nose portion 12 preferably is a good thermal conductor and provides a heat source for maintaining the adhesive at the desired temperature or viscosity.

If desired, means may be provided for insuring that the cylinder 18 is maintained full of adhesive when the plunger 20 is withdrawn. To this end there is provided a fluid connection 26 for admitting pressurized fluid such as compressed air to the chamber 14 to maintain a slight pressure above atmospheric within the chamber 14.

The plunger 20 may be driven through its drive stroke in any suitable manner. In the illustrated embodiment a standard commercial pneumatic fastener driving tool has been adapted to drive the plunger 20. Such a tool can include a housing 30 having defined therein a cylinder 32 slidably receiving a drive piston 34. A drive member 36 is connected to the drive piston 34. The drive piston and associated drive member are operated through a drive stroke upon depression of a trigger 38 and are returned either automatically or upon release of the trigger 38. One such tool is shown and described in detail in the copending application of Allen R. Obergfell, Ser. No. 767,020, filed Aug. 26, 1968.

The drive member 36 is generally cylindrical and moves through a drive track 40 defined in the nose portion 12. Since the end 36a of the drive member 36 is normally spaced above the top end of the plunger 20, the drive piston 34 and drive member 36 develop considerable velocity and inertia on operation prior to striking the plunger 20. The invention can also be carried out with a direct coupling between the piston 34 and the plunger 20.

When the fastening device 10 is to be operated, the exit opening 18b is placed adjacent the parts to be joined, and the trigger 38 is operated to render the pneumatically operated drive effective to move the drive piston 34 and drive member 36 downwardly through a drive stroke. At the end portion of this stroke, the lower end of the drive member 36 strikes the upper end of the plunger 20, and the plunger 20 is driven downwardly through the cylinder 18 with great force and speed so as to eject adhesive from the exit 18b with considerable velocity and with substantial force.

In one particular device 10 constructed in accordance with the present invention, the cross section of the cylinder 18 is 65 times the cross-sectional area of the exit 18b and the plunger 20 has a ¼ inch diameter with a ¾ inch stroke. When employing a pneumatically driven piston 34 and driver 36 having a normal velocity in the range of 90 feet per second, it is believed that the plunger 20 is impelled thereby at a speed in the range of 50 to 75 feet per second to propel the adhesive from the exit 18b at a substantially increased velocity. This velocity is sufficient to penetrate a substantial thickness of a solid workpiece, such as a wooden furring strip or veneer siding. Moreover, using a commercially available hot melt, liquid adhesive heated to the range of 250° to 400° F., the adhesive "green" sets in normal materials in 3 to 5 seconds to provide sufficient strength to maintain the parts in assembled relation.

Referring now to FIG. 2, there is illustrated a mode of use of the fastening device 10. As therein illustrated the nose portion 12 of the fastening device 10 is placed against a workpiece 44 held against the base member 46. Both the workpiece and base member, in the illustrated embodiment, are similar, being formed of wood. Firing of the fastening device 10 is effective to drive a charge of adhesive 48 through the workpiece 44 so as to spread along the interface between the workpiece 44 and the base member 46.

FIG. 3 illustrates another mode of use of a fastening device 10 wherein the nosepiece 12 of the fastening device 10 is in close proximity to, but positioned spaced above, the workpiece 44 held against the base member 46. In similar manner a charge of adhesive 48 penetrates through the workpiece 44 and spreads at the interface between the workpiece 44 and the base member 46.

It has been found by experimentation that the positioning of a tool in accordance with both the embodiments of FIGS. 2 and 3 provides a satisfactory bond with a minimum visual opening in the workpiece 44 by the penetration of the adhesive 48. However in certain applications and with certain materials the spacing of the nosepiece 12 above the workpiece 44 may provide a better appearing and less noticeable opening through the workpiece 44.

FIG. 5 illustrates the fastening of a strip onto hard material such as glass. More specifically there is illustrated a furring strip 52 which is secured to a glass base member 54 by use of the present method. Adhesive is directed through the furring strip 52 at a plurality of spaced points 56 so that the adhesive spreads at the interface between the strip 52 and the base member 54 as illustrated at 58.

FIGS. 6 and 7 illustrate the connection of workpieces 62 such as furring strips to a base member 64 here illustrated as a concrete wall. Each of the furring strips 62 is adhesively fastened in a plurality of spaced apart points by the penetration of suitable adhesive 66 through the furring strips.

In accordance with the method of the present invention, it has been determined that it is possible to control or achieve the spreading of the adhesive at the interface between the elements to be joined together. Although the phenomenon is not fully understood, it appears as if the controlled dispersion of the adhesive at the desired point is related to the nature of the discharged stream of adhesive and the nature of the workpieces to be joined. The nature of the adhesive stream is dependent on or varies with, for instance, the viscosity of the adhesive, the area of the discharge orifice, and the velocity of the discharged adhesive. Certain of these factors are interdependent and further dependent on, for example, the pressure applied to the adhesive 48 in the chamber 18 during the driving stroke. For instance, the force applied to the adhesive in the chamber 18 and the size of the exit opening 18b tend to change the temperature of the adhesive, and the change in temperature varies the viscosity of the adhesive in the discharge column.

By properly correlating the factors referred to above, it has been determined that the controlled dispersion of the adhesive at a desired interface between elements to be joined can be achieved. As an example, with two wooden workpieces to be joined, it has been determined that using hot melt adhesive at a given temperature and viscosity with a given air pressure for driving the piston 34, the stream of adhesive discharged from the tool 10 passes completely through both of the wooden workpieces. By reducing the air pressure for driving the piston 34 or by reducing the viscosity of the liquid adhesive, the adhesive stream discharged from the tool 10 passes through only the first of the two wooden workpieces and is dispersed or spread at the interface between the two workpieces to join them together. A variation in the nozzle orifice size can also be used to effect this control by increasing orifice area to reduce the workpiece penetration.

With more than two workpieces or laminae disposed adjacent each other to form a number of spaced workpiece interfaces, the nature of the liquid adhesive column can be controlled as described above to select the one of the interfaces at which spreading of the adhesive occurs. This permits the workpieces to be secured with different adhesives or at different times or permits only selected ones of the workpieces to be joined. All of this is accomplished without requiring physical separation of the plural workpieces and in those instances in which the workpiece interface is not accessible.

It has also been determined that when the nature of the liquid adhesive column has been determined to the extent necessary to obtain dispersion of the adhesive at the desired point or interface, the degree of spreading at the interface can be controlled by varying the quantity of liquid adhesive discharged and the discharge pressure used without losing the spreading at the interface. Generally, reduced discharge pressure and increased viscosity of the adhesive result in reduced spreading at the interface.

As indicated above, the achievement of spreading at an interface and the extent of the spreading are also dependent on the nature of the workpieces to be joined. It has been determined, for instance, that there is a necessity to exert some control over the nature of the discharged liquid adhesive stream when two wooden workpieces or a wooden workpiece and a lamina of drywall are to be joined at an interface between these two workpieces. On the other hand, when the liquid stream of adhesive is to pass through a drywall lamina or a wooden workpiece to an interface formed by a second and rather dense workpiece such as glass (FIG. 5) or concrete (FIG. 7), the nature of the liquid adhesive column does not require the same degree of control. In this situation, the adhesive spreading readily occurs at the interface, and changes in the adhesive column effect primarily a control over the degree of spreading.

It is also believed that the arrangement of the workpieces has an effect on the dispersion or spreading of the adhesive at a workpiece interface. As an example, using wooden workpieces to be joined and a discharged adhesive column of a given nature, the adhesive can be made to increase its penetration of the workpiece, even to the extent of passing through the workpieces, by applying a compressive force to the workpieces so that the interface between the workpieces is formed by a very small airgap. On the other hand, with the same workpieces and adhesive column, the removal of the clamping pressure increases the airgap at the interface and causes substantial spreading of the adhesive into the interface with very little penetration of the second workpiece.

Although the present invention has been described by reference to only a single embodiment thereof, and various modes of operation and methods of use thereof have been described, it will be apparent that numerous other modifications and embodiments may be devised by those skilled in the art and it is intended by the appended claims to cover all modifications and embodiments which fall within the true spirit and scope of the present invention.

What is claimed as new and desired to be secured by Letters Patent of The United States is:

1. A method of fastening a solid workpiece to a base member with an adhesive comprising driving adhesive through the solid workpiece by its own inertia and through an opening formed by the adhesive, and providing spreading of the adhesive at the interface of the workpiece and base member.

2. A method of fastening a solid workpiece to a base member with an adhesive comprising positioning a nozzle in proximity to a workpiece, ejecting adhesive from the nozzle at sufficient velocity to penetrate through the solid workpiece through an opening formed by the ejected adhesive, and providing spreading of the penetrated adhesive at the interface between the workpiece and base member.

3. A method of fastening as set forth in claim 2 wherein said nozzle is positioned spaced apart from said workpiece.

4. A method of fastening as set forth in claim 2 wherein said adhesive is of the hot melt type, and wherein there is provided the step of heating the adhesive to liquefy the same.

5. A method of fastening two workpieces by an adhesive layer at the interface between the workpieces which includes the steps of placing the workpieces adjacent each other to form an interface, directing a free column of liquid adhesive at the workpieces, and adjusting the characteristics of the column to obtain penetration of a solid one of the workpieces by the adhesive through an opening formed by the adhesive and dispersion of the adhesive in the interface.

6. The method set forth in claim 5 in which the adjusting step includes adjusting the velocity of the adhesive column.

7. The method set forth in claim 5 in which the adjusting step includes adjusting the viscosity of the adhesive column.

8. The method set for the in claim 5 in which the adjusting step includes adjusting the cross-sectional area of the adhesive column.

9. A method of fastening two workpieces by adhesive layer at the interface between the workpieces which includes the steps of placing the workpieces adjacent each other to form an interface, directing a stream of liquid adhesive at the workpieces to penetrate at least a solid one of the workpieces through an opening formed by the adhesive, and adjusting the gap formed at the interface to the extent necessary to obtain dispersion or spreading of the liquid adhesive column at the interface.

10. The method set forth in claim 9 in which the step of adjusting the gap includes applying a compressive force to the workpieces to the extent necessary to cause dispersion of the liquid adhesive column into the interface.

11. A method of adhesively joining a number of workpieces or laminae at least some which are solid, which method includes the steps of positioning the workpieces adjacent each other to form a number of interfaces therebetween, directing a column of liquid adhesive at the workpieces to penetrate at least some of the solid workpieces through an opening formed by the column of liquid, and adjusting the characteristics of the liquid column to cause the liquid to disperse or spread in a selected one of the interfaces.

12. The method set forth in claim 11 in which the step of adjusting includes adjusting the velocity of the liquid column.

13. The method set forth in claim 2 in which the step of adjusting includes adjusting the cross-sectional area of the column.

14. A method of fastening two workpieces at least one of which is solid by the use of an adhesive layer, which method includes the steps of placing the workpieces adjacent each other to form an interface therebetween, driving a liquid column of adhesive through a solid one of the workpieces through an opening formed by the liquid column, the column having a first cross sectional area, and providing spreading of the liquid adhesive column in the interface to provide an adhesive layer in the interface joining the workpieces and having an area appreciably greater than said first cross sectional area.

15. A method of fastening two workpieces at least one of which is solid by the use of an adhesive layer, which method includes the steps of placing the workpieces adjacent each other to form an interface therebetween, compressing a partially confined body of liquid adhesive to form a moving column of liquid adhesive, directing the column at a solid workpiece to penetrate the workpiece through an opening formed by the liquid column, and dispersing the liquid column at the interface to form and adhesive layer between the workpieces in the interface.

16. The method set forth in claim 15 in which the step of compressing the body of liquid adhesive includes the step of applying an impact force to the body of liquid adhesive.